(12) United States Patent
Dorrer

(10) Patent No.: US 7,555,221 B2
(45) Date of Patent: Jun. 30, 2009

(54) METHOD AND APPARATUS FOR POLARIZATION-INDEPENDENT RF SPECTRUM ANALYSIS OF AN OPTICAL SOURCE

(75) Inventor: Christophe J Dorrer, Matawan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 533 days.

(21) Appl. No.: 11/020,930

(22) Filed: Dec. 23, 2004

(65) Prior Publication Data

US 2006/0140638 A1      Jun. 29, 2006

(51) Int. Cl.
H04B 10/00      (2006.01)

(52) U.S. Cl. ..................................... 398/152
(58) Field of Classification Search ................... 398/16, 398/182–201, 152, 140–172
See application file for complete search history.

(56) References Cited

U.S. PATENT DOCUMENTS

| | | | | |
|---|---|---|---|---|
| 4,941,738 A * | 7/1990 | Olsson | ....................... | 359/347 |
| 5,386,314 A * | 1/1995 | Jopson | ....................... | 359/326 |
| 5,604,618 A * | 2/1997 | Mori et al. | .................. | 398/150 |
| 5,910,852 A * | 6/1999 | Fontana et al. | .............. | 398/185 |
| 5,940,207 A * | 8/1999 | Weich et al. | ................ | 359/333 |
| 6,078,417 A * | 6/2000 | Perino et al. | ................ | 398/157 |
| 6,104,477 A * | 8/2000 | Yoshida et al. | ............... | 356/73 |
| 6,118,523 A * | 9/2000 | Brener et al. | ............... | 356/73.1 |
| 6,411,413 B1 * | 6/2002 | Bergano | ..................... | 398/200 |
| 6,476,959 B2 * | 11/2002 | Yao | ............................. | 359/334 |
| 6,501,551 B1 * | 12/2002 | Tearney et al. | .............. | 356/477 |
| 6,519,079 B1 * | 2/2003 | Grochocinski et al. | ...... | 359/337 |
| 6,529,314 B1 * | 3/2003 | Shukunami et al. | ......... | 359/332 |
| 6,618,513 B2 * | 9/2003 | Evankow, Jr. | ................ | 385/11 |
| 6,646,774 B1 * | 11/2003 | Willner et al. | .............. | 359/246 |
| 6,671,056 B2 * | 12/2003 | Szafraniec | ................... | 356/484 |
| 6,738,181 B1 * | 5/2004 | Nakamoto et al. | .......... | 359/337 |
| 6,879,433 B1 * | 4/2005 | Yamashita et al. | .......... | 359/332 |
| 7,127,138 B2 * | 10/2006 | Efimov et al. | ................ | 385/33 |
| 7,136,559 B2 * | 11/2006 | Yusoff et al. | ................ | 385/125 |
| 7,245,833 B1 * | 7/2007 | Volkening | ................... | 398/116 |
| 2002/0158189 A1 * | 10/2002 | Yamaguchi | .................. | 250/225 |
| 2003/0016425 A1 * | 1/2003 | Tan et al. | ..................... | 359/192 |
| 2003/0137653 A1 * | 7/2003 | Kawabata | ................... | 356/73.1 |
| 2003/0185482 A1 * | 10/2003 | Nakajima | ..................... | 385/11 |
| 2004/0067017 A1 * | 4/2004 | Ionov et al. | ................... | 385/37 |
| 2004/0165885 A1 | 8/2004 | Dorrer | ......................... | 398/16 |
| 2004/0223160 A1 * | 11/2004 | Chen et al. | .................. | 356/460 |
| 2005/0012934 A1 * | 1/2005 | Szafraniec | ................... | 356/484 |
| 2005/0111802 A1 * | 5/2005 | Lee et al. | ..................... | 385/123 |
| 2005/0232640 A1 * | 10/2005 | Boroditsky et al. | ......... | 398/152 |
| 2006/0051087 A1 * | 3/2006 | Martin et al. | ................ | 398/26 |

\* cited by examiner

*Primary Examiner*—Quan-Zhen Wang

(57) ABSTRACT

A method and apparatus for polarization-independent RF spectrum analysis of an optical source, the apparatus including a coupler for coupling the light from an optical source under test with light from a continuous-wave (CW) laser. A nonlinear apparatus is coupled to the coupler for modulating the electric field of the light from the CW laser using the temporal intensity of the light from the source under test to generate a modulated signal. The nonlinear apparatus is adapted to mitigate or compensate for any phase difference between polarization components of signals propagated through the nonlinear apparatus. A polarizer is coupled to the nonlinear apparatus for generating a linearly polarized signal from the modulated signal. An optical spectrum analyzer is coupled to the polarizer for measuring the optical spectrum of the linearly polarized signal to determine an RF spectrum of the optical source under test.

8 Claims, 5 Drawing Sheets

METHOD AND APPARATUS FOR POLARIZATION-INDEPENDENT RF SPECTRUM ANALYSIS OF AN OPTICAL SOURCE

CROSS-REFERENCE TO RELATED APPLICATION

This application relates to a co-pending application entitled "Method And Apparatus For Measuring the RF Spectrum of an Optical Signal", Application Ser. No. 10/374,939, filed Feb. 26, 2003, which is incorporated herein by reference.

FIELD OF THE INVENTION

The present invention generally relates to the field of optical communications and, more particularly, to methods and apparatus for determining the RF spectrum of an optical source using nonlinear optics.

BACKGROUND OF THE INVENTION

RF spectrum analysis of optical signals is typically performed using electronic means, such as a fast photodetector and a super-heterodyne RF spectrum analyzer. This approach, however, is limited in terms of bandwidth (e.g. due to the bandwidth limitations of the photodetector).

It has been determined that improved RF spectrum analysis of optical signals can be obtained using nonlinear optics. Using this approach, a source under test, with electric field $E(t)$, is coupled with a monochromatic source at an optical frequency $\omega_0$, and sent into a nonlinear medium with third order nonlinear response, including cross phase modulation (XPM), cross gain modulation (XGM) and two-photon absorption (TPA).

The output electric field around the frequency of the monochromatic source is related to the input by:

$$E'(t) = \sqrt{I_0} \exp(-i\omega_0 t) \exp[\alpha I(t)];$$

where $\alpha$ describes the effect of the nonlinear interaction of the source under test on the monochromatic source.

If the modulation due to the nonlinear interaction is small compared to one, one has $\exp[\alpha I(t)] = 1 + \alpha I(t)$, which yields:

$$|\int E'(t) \exp[i\alpha t] dt|^2 = I_0 \delta(\omega - \omega_0) + I_0|\alpha|^2 ||\int I(t) \exp[i(\omega - \omega_0)t] dt|^2.$$

It therefore appears that the output optical spectrum, measured for example using a grating-based optical spectrum analyzer (OSA) or a scanning Fabry-Perot etalon followed by a photodetector, is representative, up to a Dirac function at the optical frequency $\omega_0$, of the RF spectrum of the source under test centered at $\omega_0$. However, most nonlinear interactions are polarization-dependent. The previous equations assume that the source under test and the monochromatic laser have the same state of polarization in the nonlinear medium. This, however, can be difficult to achieve for several reasons. First, the source under test has, in most cases, an unknown polarization state. Secondly, the polarization state of the source under test can be time-dependent, for example, when pulses are polarization multiplexed so that adjacent temporal bits do not interfere. Thirdly, the polarization state of the two sources can be modified during propagation in the nonlinear element because of, for example, polarization mode dispersion in a non-polarization maintaining fiber. Finally, and perhaps more importantly, the definition of the RF spectrum is polarization-independent, i.e. for a source under test with electric field $E(t) = E_x(t)\hat{x} + E_y(t)\hat{y}$, the RF spectrum is:

$$S(\Omega) = |\int (I_x(t) + I_y(t)) \cdot \exp(i\Omega t) dt|^2$$

where $I_x(t) = |E_x(t)|^2$ and $I_y(t) = |E_y(t)|^2$. If XPM in a fiber is used, the nonlinear coefficients describing the modulation of the monochromatic laser by the source under test depend upon the relative state of polarization of the two sources. Therefore, no correspondence between the RF spectrum and the optical spectrum after modulation is obtained in the general case for such implementation since the measured optical spectrum does not depend identically upon the polarized components of the source under test along $\hat{x}$ and $\hat{y}$.

There is therefore a need for method and apparatus to improve on this technique and obtain polarization-independent determination of the RF spectrum, while retaining the capability to provide ultrahigh bandwidth RF spectrum analysis.

SUMMARY OF THE INVENTION

The deficiencies of the prior art are addressed by the present invention, which provides a method and apparatus for polarization-independent RF spectrum analysis of an optical source. Preferred embodiments of the invention allow for polarization-independent ultrahigh bandwidth determination of a representation of the RF spectrum of an optical source.

In one embodiment of the present invention, an apparatus is provided for polarization-independent RF spectrum analysis of an optical source, comprising a coupler for coupling the light from an optical source under test with light from a continuous-wave (CW) laser to generate a combined signal. A nonlinear apparatus is coupled to the coupler for modulating the electric field of the light from the CW laser using the temporal intensity of the light from the source under test to generate a modulated signal. The nonlinear apparatus is adapted to mitigate or compensate for any phase difference between polarization components of signals propagated through the nonlinear apparatus. A polarizer is coupled to the nonlinear apparatus for generating a linearly polarized signal. An optical spectrum analyzer is coupled to the polarizer for measuring the optical spectrum of the linearly polarized signal to determine an RF spectrum of the optical source under test.

In another embodiment of the present invention, a method for polarization-independent RF spectrum analysis of an optical source is provided comprising coupling the light from an optical source under test with light from a CW laser to generate a combined signal. The combined signal is propagated through a nonlinear apparatus to generate a modulated signal. The modulated signal is linearly polarized, and the optical spectrum of the polarized signal is measured to determine an RF spectrum of the optical source under test.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements and instrumentalities shown.

In the drawings.

DETAILED DESCRIPTION OF THE INVENTION

Figure 1:
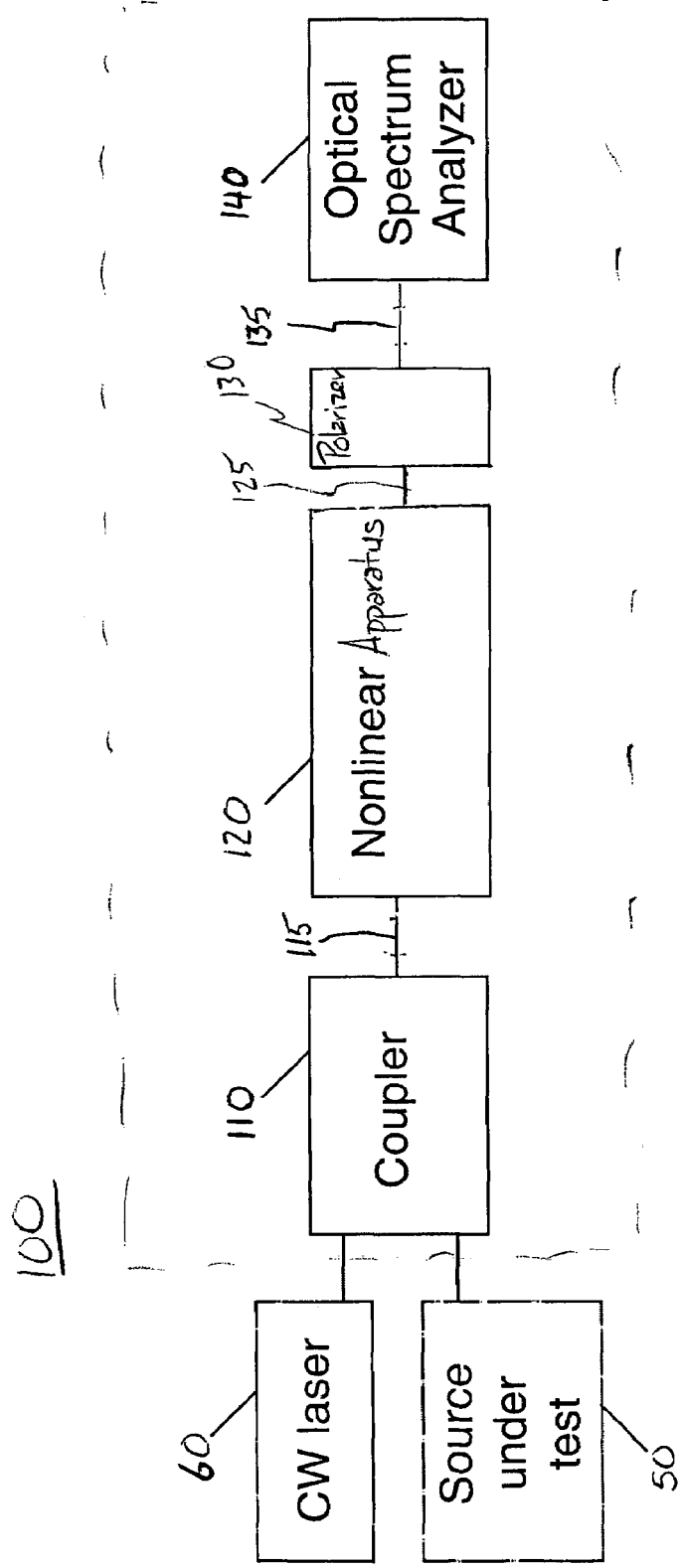
FIG. 1 is a block diagram illustrating an apparatus according to one embodiment of the present invention.

FIG. 1 depicts an apparatus 100 according to one embodiment of the invention, which uses nonlinear optics for polarization-independent RF spectrum analysis of an optical source. The apparatus comprises a coupler 110 for coupling the light from an optical source under test 50 with light from a CW laser 60 to generate a combined signal 115.

The coupler 110 may comprise, for example, a fiber coupler with a predefined ratio. The CW laser 60 and the source under test 50 have different optical frequencies. Therefore, a coupler based on wavelength-division multiplexing technology, i.e. a coupler that can be used to combine sources of different optical wavelength, may be used for coupler 110.

The polarization state of the source under test 50 may be unknown, and can be time-varying. The electric field of light from the source under test 50 can be written as $E(t)=E_x(t)\hat{x}+E_y(t)\hat{y}$ and its intensity is by definition $$I(t)=I_x(t)+I_y(t) \text{ with } I_x(t)=|E_x(t)|^2 \text{ and } I_y(t)=|E_y(t)|^2.$$

The CW laser 60 operates at an optical frequency $\omega_0$, preferably chosen outside the range of optical frequencies where the source under test 50 has spectral density. The polarization state of the CW laser 60 can be set to a predetermined state for the optimization of the operation of embodiments of the present invention. The CW laser 60 is preferably polarized along the $\hat{x}+\hat{y}$ axis. The electric field of the CW laser 60 can therefore be written as $E_0 \exp(-i\omega_0 t)\cdot[\hat{x}+\hat{y}]$.

A nonlinear apparatus 120 is coupled to the coupler 110 for modulating the electric field of the light from the CW laser 60 using the temporal intensity of the light from the source under test 50 to generate a modulated signal 125. As will be discussed further below, the nonlinear apparatus 120 contains a nonlinear medium for imparting third-order nonlinearities to optical signals passing there through. The term "modulated signal", as used herein, refers to the combined signal 115 after the nonlinear interaction (within the nonlinear medium) of the light from the CW laser 60 and the light from the source under test 50.

The electric field of the modulated signal 125 around the optical frequency $\omega_0$ can be written as:

$$E'(t)=E_0\exp(-i\omega_0 t)[\exp[\alpha I_x(t)]\hat{x}+\exp[\alpha I_y(t)]\hat{y}].$$

The nonlinear apparatus 120 is adapted to mitigate or compensate for any phase difference between polarization components of signals propagated through the nonlinear apparatus 120. Specifically, as will be discussed below with reference to preferred embodiments, the nonlinear apparatus 120 can be arranged to provide compensation for any phase difference (i.e. phase delay) between polarization components of signals propagated through the nonlinear apparatus 120 (e.g. the combined signal 115), which is caused by, for example, propagation through a nonlinear medium (discussed below) in the nonlinear apparatus 120

Alternatively, the nonlinear apparatus 120 can be arranged to avoid or mitigate the production of a phase difference between polarization components of signals propagated through the nonlinear apparatus 120, thereby avoiding the specific need for compensation of any induced phase difference.

A polarizer 130 is coupled to the nonlinear apparatus 120 for generating a linearly polarized signal 135 from the modulated signal 125. The polarizer 130 has its axes set at 45 degrees, i.e. the two output ports of the polarizer 130 correspond to the linear polarization states $\hat{x}+\hat{y}$ and $\hat{x}-\hat{y}$. A polarized signal 135 is produced at the output port corresponding to the linear state $\hat{x}+\hat{y}$, with an electric field which can be written as:

$$E'''(t)=E_0\exp(-i\omega_0 t)[\exp[(\alpha I_x(t)]+\exp[\alpha I_y(t)]].$$

Assuming small modulation of light from the CW laser 60 by the light from the source under test 50, one has $\exp[\alpha I_x(t)]=1+\alpha I_x(t)$ and $\exp[\alpha I_y(t)]=1\alpha I_y(t)$. The electric field of the polarized signal 135 can be written as:

$$E'''(t)=E_0\exp(-i\omega_0 t)[2+\alpha I_x(t)+\alpha I_y(t)],$$

and therefore be expressed as a function of the intensity of the source $I(t)=I_x(t)+I_y(t)$ as:

$$E'''(t)=E_0\exp(-i\omega_0 t)[2+\alpha I(t)].$$

Those skilled in the art will recognize that the alignment of the axes of the polarizer 130 and the optimization of the polarization state of the CW laser 60 can be performed in order to compensate for different strengths of nonlinear interactions along the two axes of the nonlinear apparatus 120.

An optical spectrum analyzer (OSA) 140 is coupled to the polarizer 130 for measuring the optical spectrum of the polarized signal 135 to determine the RF spectrum (i.e. a representation thereof) of the optical source under test 50. The OSA 140 can be, for example a grating-based system (not shown) or a scanning Fabry-Perot etalon followed by a photodiode (not shown).

The optical spectrum measured by the OSA 140 is by definition $I'''(\omega)=|\int E'''(t) \exp(i\omega t)dt|^2$, and can therefore be expressed as:

$$I'''(\omega)=I_0\cdot|\int[1+\alpha I(t)]\exp[i(\omega-\omega_0)t]dt|^2.$$

The latter expression can be developed, and leads to the optical spectrum measured by the OSA 140 as:

$$I'''(\omega)=|\alpha|^2\cdot|\int I(t)\cdot\exp[i(\omega-\omega_0)t]dt|^2,$$

after omission of a Dirac function at the optical frequency $\omega_0$. One therefore obtains a representation of the RF spectrum of the source under test 50 by measuring the optical spectrum of the electric field of the polarized signal 135 using the OSA 140. Specifically, the RF spectrum of the source under test 50, which is defined by $S(\Omega)=|\int I(t)\cdot\exp(i\Omega t)dt|^2$, is given by the optical spectrum measured by the OSA 140 at the optical frequency $\omega=\omega_0+\Omega$.

Figure 2:
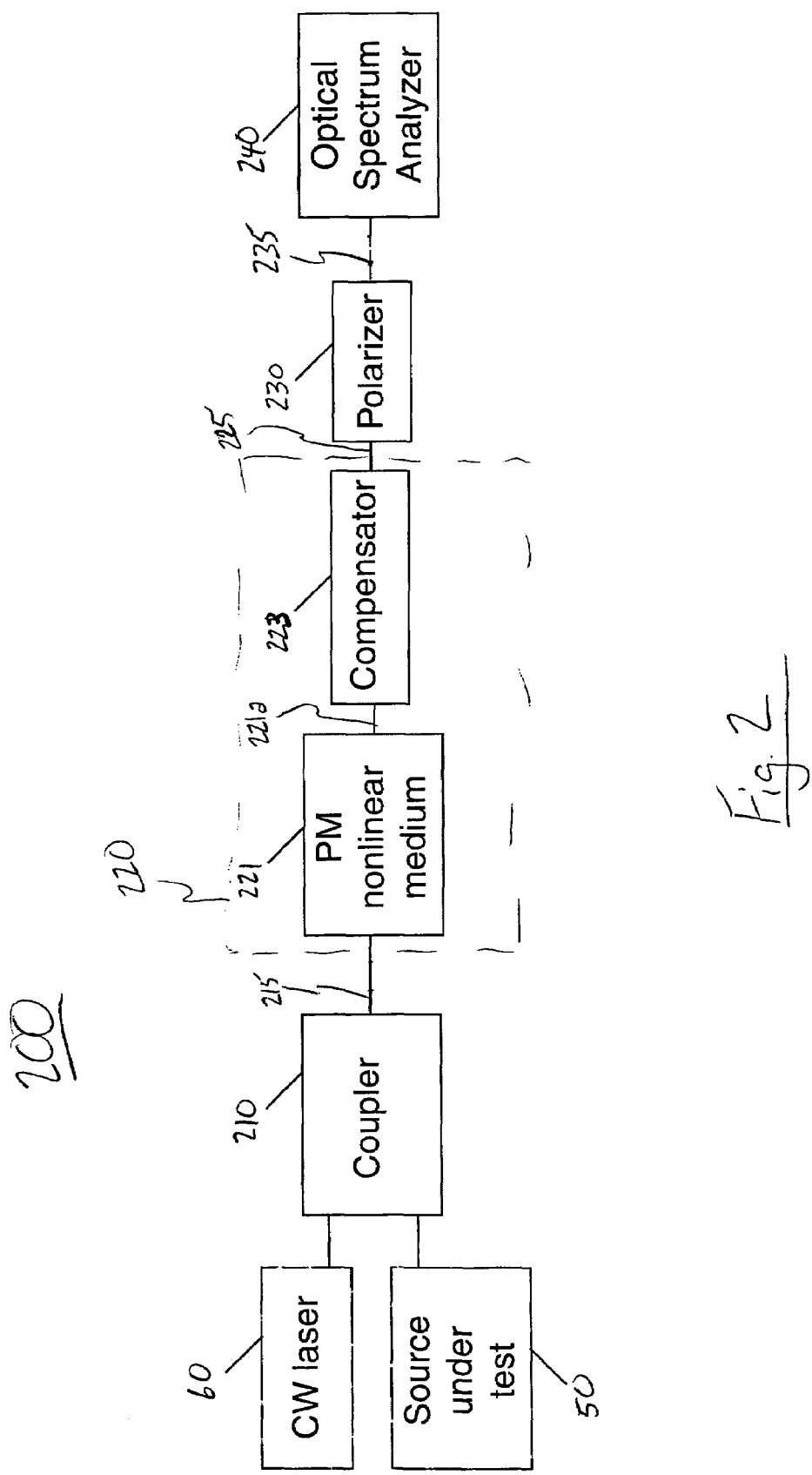
FIG. 2 is a block diagram illustrating an apparatus according to another embodiment of the present invention.

In one preferred embodiment shown in FIG. 2, the nonlinear apparatus 220 comprises a polarization-maintaining (PM) nonlinear medium 221 coupled to a compensator device 223. The PM nonlinear medium 221 may be, for example a PM fiber, for which structural changes in the cladding of the fiber define two orthogonal principal axes. These axes define propagation modes that preserve the polarization state of the light propagating in the fiber.

As in the embodiments discussed above, the source under test 50 and CW laser 60 are coupled using a coupler 210 to produce a combined signal 215. Propagation of the combined signal 215 in the PM nonlinear medium 221 produces a signal 221a with an electric field around the optical frequency $\omega_0$ $E'(t)=E_x'(t)\hat{x}+E_y'(t)\hat{y}$. The fields $E_x'(t)$ and $E_y'(t)$ are given by:

$$E_x'(t)=E_0\exp(-i\omega_0 t)\exp[\alpha I_x(t)],$$

$$E_y'(t)=E_0\exp(-i\omega_0(t-\tau))\exp[\alpha I_y(t-\tau)],$$

where $\omega_0\tau$ is the phase difference between components of the combined signal 215 propagated along the two principal axes $\hat{x}$ and $\hat{y}$ of the PM nonlinear medium 221 at a frequency $\omega_0$. The compensator 223 is used after the PM nonlinear medium 221 in order to compensate $\tau$, therefore compensating any phase difference produced from propagation along the two axes of the PM nonlinear medium 221.

The compensator 223 can be built out of birefringent elements. The electric field of the modulated signal 225 after the compensator 223 is therefore written $E''(t)=E_x''(t)\hat{x}+E_y''(t)\hat{y}$ with:

$$E_x''(t)=E_0\exp(-i\omega_0 t)\exp[\alpha I_x(t)],$$

$$E_y''(t)=E_0\exp(-i\omega_0 t)\exp[\alpha I_y(t)].$$

Operation of the polarizer 230 and the OSA 240 is substantially similar to that of the polarizer 130 and OSA 140 discussed above. The linearly polarized signal 235 is produced at the output port of the polarizer 230 aligned along $\hat{x}+\hat{y}$ and can be written as:

$$E'''(t)=E_0\exp(-i\omega_0 t)\lfloor\exp[\alpha I_x(t)]+\exp[\alpha I_y(t)]\rfloor$$

Assuming a small modulation of light from the CW laser 60 by the light from the source under test 50, the optical spectrum measured by the OSA 240 around the optical frequency $\omega_0$ can be written up to a Dirac function at the optical frequency $\omega_0$ as $I'''(\omega)=|\alpha|^2 \cdot |\int I(t)\cdot\exp[i(\omega-\omega_0)t]dt|^2$.

A representation of the RF spectrum of the source under test 50 can therefore be obtained by measuring the optical spectrum of the electric field of the polarized signal 235 using the OSA 240. Specifically, the RF spectrum of the source under test 50, which is defined by $S(\omega)=|\int I(t)\cdot\exp(i\Omega t)dt|^2$, is given by the optical spectrum measured by the OSA 240 at the optical frequency $\omega=\omega_0+\Omega$.

Figure 3:
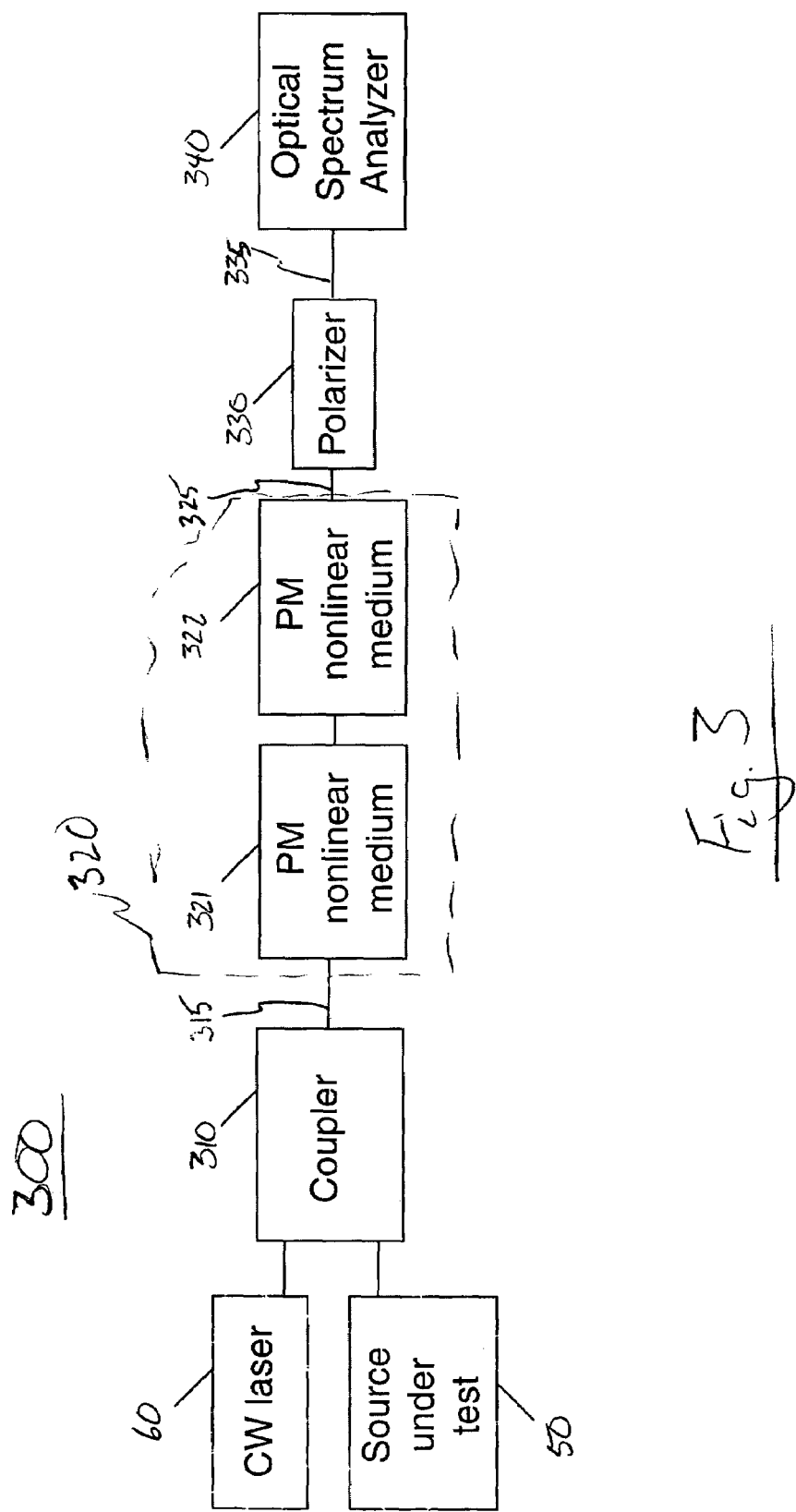
FIG. 3 is a block diagram illustrating an apparatus according to another embodiment of the present invention.

In another preferred embodiment shown in FIG. 3, the nonlinear apparatus 320 comprises a first polarization maintaining nonlinear medium 321 coupled to a second PM nonlinear medium 322. The second PM nonlinear medium 322 is preferably substantially identical to that of the first PM nonlinear medium 321, but has its principal axes rotated by about 90° relative to the first PM nonlinear medium 321.

As in the embodiments discussed above, the source under test 50 and CW laser 60 are coupled using a coupler 310 to produce a combined signal 315. Propagation of the combined signal 315 in the first PM nonlinear medium 321 produces a signal with an electric field around the optical frequency $\omega_0$ equal to $E'(t)=E_x'(t)\hat{x}+E_y'(t)\hat{y}$. The fields $E_x'(t)$ and $E_y'(t)$ are given by:

$$E_x'(t)=E_0\exp(-i\omega_0 t)\exp[\alpha I_x(t)],$$

$$E_y'(t)=E_0\exp(-i\omega_0(t-\tau))\exp[\alpha I_y(t-\tau)],$$

where $\omega_0\tau$ is the phase difference between the two principal axes of the PM nonlinear medium 321 at a frequency $\omega_0$.

Propagation in the second PM nonlinear medium 322 leads to additional modulation of the light from the CW laser 60 by the light from the source under test 50, and cancels the propagation phase difference between the components of the combined signal 315 due to the first PM nonlinear medium 321. The electric field of the modulated signal 325 after the second PM nonlinear medium 322 is therefore written $E''(t)=E_x''(t)\hat{x}+E_y''(t)\hat{y}$, with:

$$E_x''(t)=E_0\exp(-i\omega_0 t)\exp[2\alpha I_x(t)],$$

$$E_y''(t)=E_0\exp(-i\omega_0 t)\exp[2\alpha I_y(t)].$$

There is therefore no need for additional phase compensation (e.g. using compensator 223), although it is understood that an additional compensator (not shown) may be employed for more precision to, for example, cancel imperfections in the matching of the properties of the first and second PM nonlinear medium 321, 322.

Operation of the polarizer 330 and the OSA 340 is substantially similar to that of the polarizer 130 and OSA 140 discussed above. A linearly polarized signal 335 is produced at the output port of the polarizer 330 aligned along $\hat{x}+\hat{y}$, and can be written as:

$$E'''(t)=E_0\exp(-i\omega_0 t)\lfloor\exp[2\alpha I_x(t)]+\exp[2\alpha I_y(t)]\rfloor.$$

Assuming a small modulation of light from the CW laser 60 by the light from the source under test 50, the optical spectrum measured by the OSA 340 around the optical frequency $\omega_0$ can be written up to a Dirac function at the optical frequency $\omega_0$ as:

$$I'''(\omega)=4|\alpha|^2\cdot|\int I(t)\cdot\exp[i(\omega-\omega_0)t]dt|^2.$$

A representation of the RF spectrum of the source under test 50 can therefore be obtained by measuring the optical spectrum of the electric field of the polarized signal 335 using the OSA 340. Specifically, the RF spectrum of the source under test 50, which is defined by $S(\Omega)=|\int I(t)\cdot\exp(i\Omega t)dt|^2$, is given by the optical spectrum measured by the OSA 340 at the optical frequency $\omega=\omega_0+\Omega$.

Those skilled in the art will recognize that the alignment of the axes of the polarizer 330 and the optimization of the polarization state of the CW laser 60 can be performed in order to compensate for different strength of nonlinear interactions along the axes of the PM nonlinear medium 321, 322.

Figure 4:
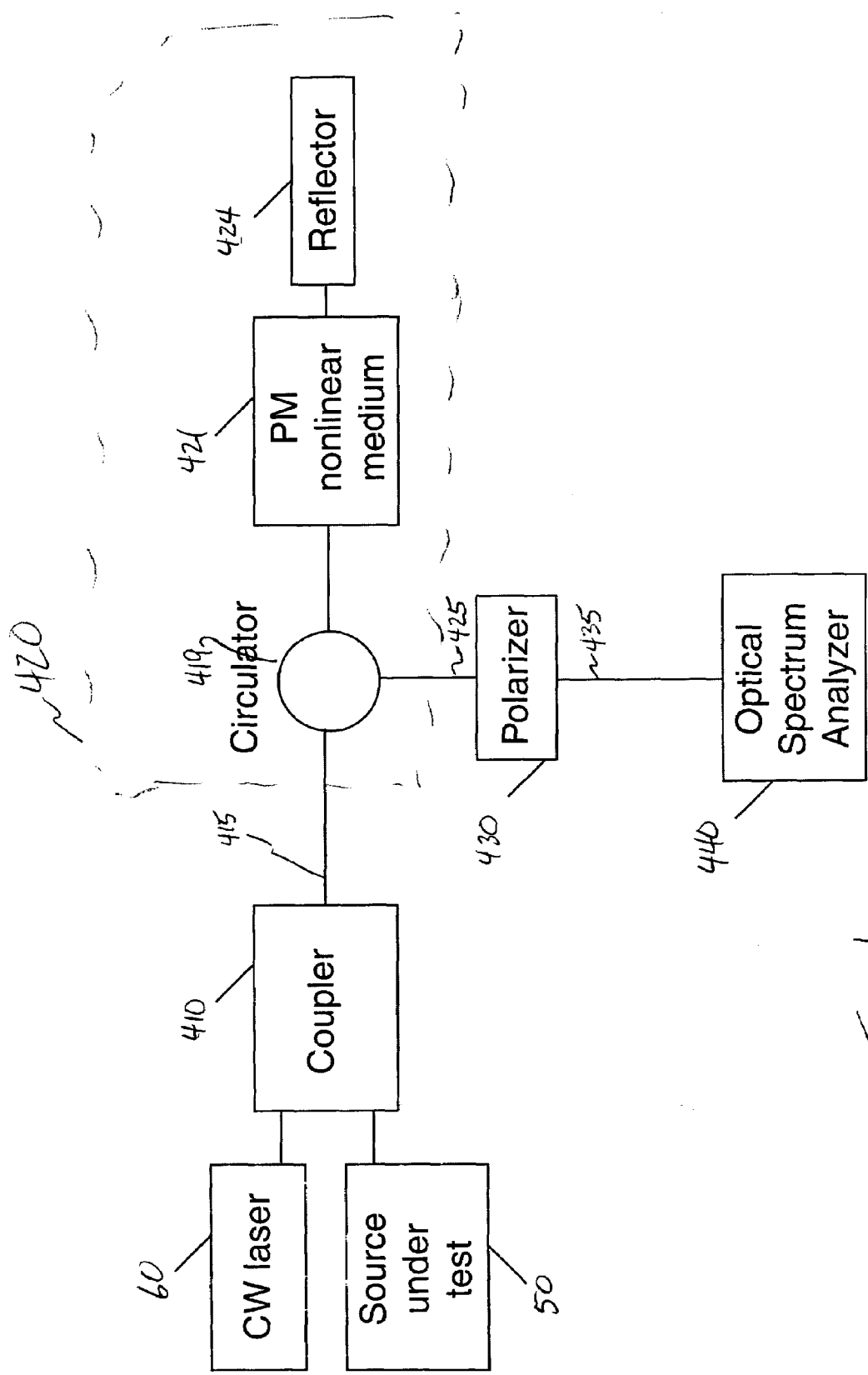
FIG. 4 is a block diagram illustrating an apparatus according to another embodiment of the present invention.

In another preferred embodiment shown in FIG. 4, the nonlinear apparatus 420 comprises a circulator 419, a PM nonlinear medium 421 coupled to the circulator 419, and a reflector 424 coupled to the PM nonlinear medium 421.

The circulator 419, the PM nonlinear medium 421, and the reflector 424 are operatively coupled such that combined signals 415 from the coupler 410 are routed by the circulator 419 through the PM nonlinear medium 421, reflected off of the reflector 424 back through the PM nonlinear medium 421, and routed by the circulator 419 to the polarizer 430.

As in the embodiments discussed above, the source under test 50 and CW laser 60 are coupled using a coupler 410 to produce a combined signal 415. The combined signal 415 is then routed to the PM nonlinear medium 421 by the circulator 419. Propagation of the combined signal 415 in the PM nonlinear medium 421 produces a signal with an electric field around the optical frequency $\Omega_0$ $E'(t)=E_x'(t)\hat{x}+E_y'(t)\hat{y}$. The fields $E_x'(t)$ and $E_y'(t)$ are given by:

$$E_x'(t)=E_0\mathrm{Exp}(-i\omega_0 t)\exp[\alpha I_x(t)],$$

$$E_y'(t)=E_0\exp(-i\omega_0(t-\tau))\exp[\alpha I_y(t-\tau)],$$

where $\omega_0\tau$ is the phase difference between the two principal axes of the PM nonlinear medium 421 at a frequency $\omega_0$.

The reflector 424 is configured to rotate the polarization state of signals at the output of the PM nonlinear medium 421 by 90°. The reflector device 424 can be, for example, a free-space assembly (not shown) including a quarter-wave plate followed by a mirror.

Propagation back through the PM nonlinear medium 421 leads to additional modulation of the light from the CW laser 60 by the light from the source under test 50, and cancels any phase difference between the components of the combined signal 415.

The electric fields of the output from the PM nonlinear medium 421 after propagation of reflected signals back through the PM nonlinear medium 421 are:

$$E_x''(t)=E_0\exp(-i\omega_0 t)\exp[2\alpha I_x(t)],$$

$$E_y''(t)=E_0\exp(-i\omega_0 t)\exp[2\alpha I_y(t)].$$

There is therefore no need for differential phase compensation (e.g. using compensator 223), although it is understood that an additional compensator (not shown) may be employed to compensate for possible imperfections in alignment.

Signals from the PM nonlinear medium 421 are routed by the circulator 419 to the polarizer 430. Operation of the polarizer 430 and the OSA 440 is substantially similar to that of the polarizer 130 and OSA 140 discussed above. The modulated signal 425 is sent to the polarizer 430 having axes set along $\hat{x}+\hat{y}$ and $\hat{x}-\hat{y}$. A linearly polarized signal 435 is produced at the output port of the polarizer 430 aligned along $\hat{x}+\hat{y}$, and can be written as:

$$E'''(t)=E_0\exp(-i\omega_0 t)[\exp[2\alpha I_x(t)]+\exp[2\alpha I_y(t)]]$$

Assuming a small modulation of light from the CW laser 60 by the light from the source under test 50, the optical spectrum measured by the OSA 440 around the optical frequency $\omega_0$ can be written up to a Dirac function at the optical frequency $\omega_0$ as:

$$I'''(\omega)=4|\alpha|^2\cdot|\int I(t)\cdot\exp[i(\omega-\omega_0)t]dt|^2.$$

A representation of the RF spectrum of the source under test 50 can therefore be obtained by measuring the optical spectrum of the electric field of the polarized signal 435 using the OSA 440. Specifically, the RF spectrum of the source under test 50, which is defined by $S(\Omega)=|\int I(t)\cdot\exp(i\Omega t)dt|^2$, is given by the optical spectrum measured by the OSA 440 at the optical frequency $\omega=\omega_0+\Omega$.

Those skilled in the art will recognize that the alignment of the axes of the polarizer 430 and the optimization of the polarization state of the CW laser 60 can be performed in order to compensate for different strength of nonlinear interactions along the two axes of the PM nonlinear medium 421.

Figure 5:
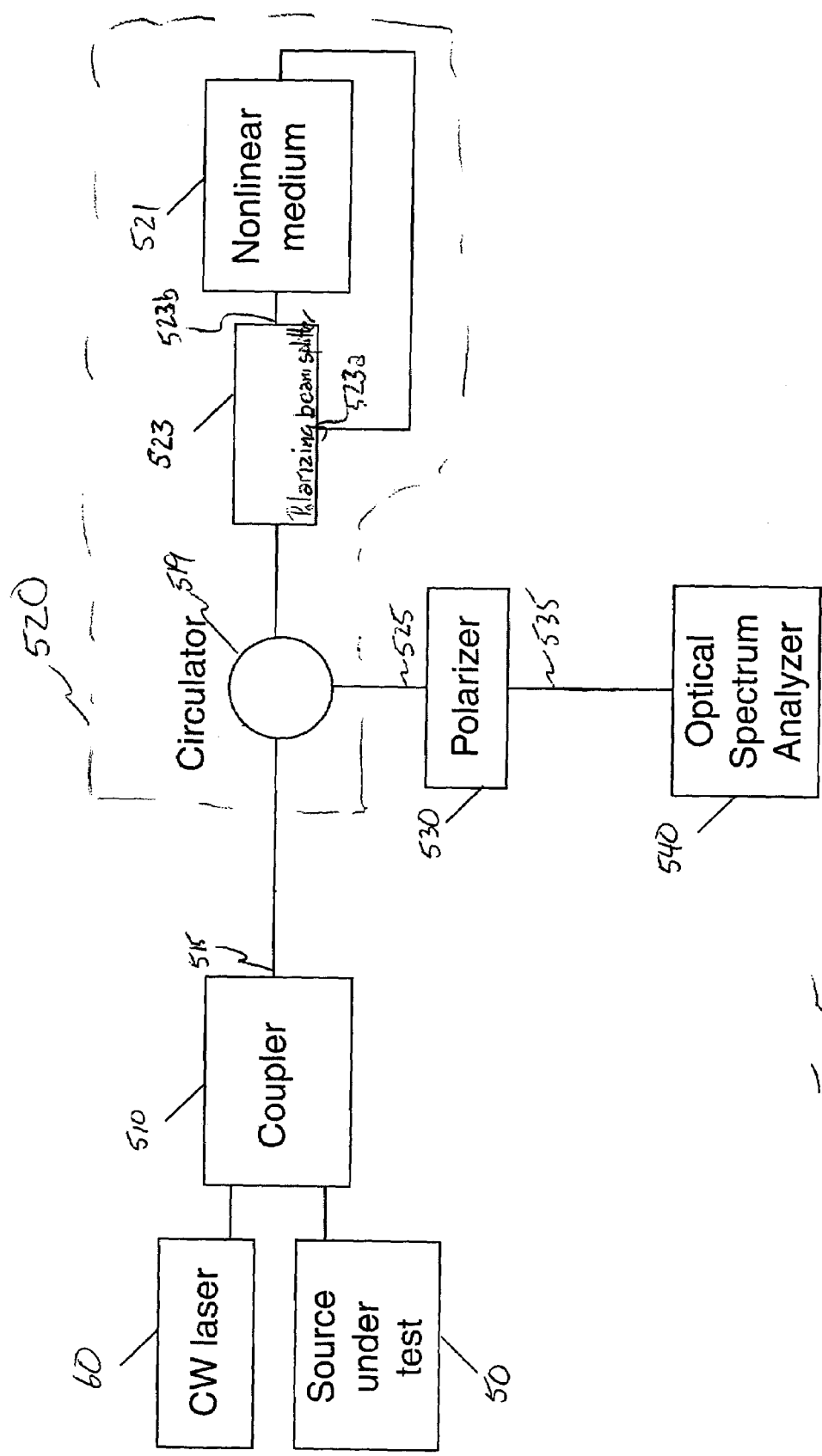
FIG. 5 is a block diagram illustrating an apparatus according to another embodiment of the present invention.

In another preferred embodiment shown in FIG. 5, the nonlinear apparatus 520 comprises a circulator 519, a polarizing beamsplitter 523 coupled to the circulator 519, and a nonlinear medium 521 coupled to the polarizing beam splitter 523.

As in the embodiments discussed above, the source under test 50 and CW laser 60 are coupled using a coupler 510 to produce a combined signal 515. The electric field of the CW laser 60 polarized along $\hat{x}+\hat{y}$ is $E_0\exp(-i\omega_0 t)\cdot[\hat{x}+\hat{y}]$. The electric field of the source under test 50 is $E(t)=E_x(t)\hat{x}+E_y(t)\hat{y}$. The circulator 519, the polarizing beam splitter 523, and the nonlinear medium 521 are operatively coupled such that combined signals 515 from the coupler 510 are routed by the circulator 519 through the polarizing beam splitter 523.

The polarizing beam splitter 523 has two ports 523a and 523b that correspond to the two polarization states $\hat{x}$ and $\hat{y}$. The electric field of the light at one port (e.g. 523a) is:

$$E_0\cdot\exp(-i\omega_0 t)+E_x(t),$$

while the light at the other port (e.g. 523b) is described by the electric field:

$$E_0\cdot\exp(-i\omega_0 t)+E_y(t).$$

The nonlinear medium 521 has two principal propagation axes $\hat{\alpha}$ and $\hat{\beta}$. The nonlinear medium 521 is configured to accept the signal from the port 523a (polarized along $\hat{x}$) and the signal from the port 523b (polarized along $\hat{y}$) along the same propagation axe (e.g. $\hat{\alpha}$). In such configuration, the signals exiting the polarization beamsplitter 523 from the ports 523a and 523b are then counter-propagated along the same polarization mode through the nonlinear medium 521. The nonlinear interaction of the two polarization components of the source under test 50 on the CW laser 60 therefore occurs independently in the nonlinear medium 521. The electric field of the signal from port 523a after nonlinear interaction is:

$$E_x'(t)=E_0\exp(-i\omega_0 t)\exp[\alpha I_x(t)],$$

while the signal from port 523b after nonlinear interaction is:

$$E_y'(t)=E_0\exp(-i\omega_0 t)\exp[\alpha I_y(t)].$$

It will be appreciated by those skilled in the art that the strength of the nonlinear interaction is identical for the two signals since they physically propagate along the same axis of the PM nonlinear medium 521. Additionally, the source under test 50 and CW laser 60 have identical polarization in the nonlinear medium, which optimizes the nonlinear interaction, for example by reducing the group velocity dispersion between the two sources.

It is understood that in such configuration, the optical paths for light polarized along x and y are identical when propagating into the medium since they propagate in the same mode in the medium (but in a different direction). There is therefore no need for differential phase compensation (e.g. using compensator 223), although it is understood that an additional compensator (not shown) may be employed for more precision.

The polarization components are then recombined by the polarizing beam splitter 523, i.e. the polarization component that exited the polarizing beamsplitter 523 by port 523a is inputed to the same polarization beamsplitter at port 523b, while the polarization component that exited the polarizing beamsplitter 523 by port 523b is inputed to the same polarization beamsplitter at port 523a). The recombined signal is propagated back through the circulator 519, and routed to the polarizer 530.

Operation of the polarizer 530 and the OSA 540 is substantially similar to that of the polarizer 130 and OSA 140 discussed above. The modulated signal 525 is sent to the polarizer 530 having axes set along $\hat{x}+\hat{y}$ and $\hat{x}-\hat{y}$. A linearly polarized signal 535 is produced at the output port of the polarizer 430 aligned along $\hat{x}+\hat{y}$, and can be written as:

$$E'''(t)=E_0\exp(-i\omega_0 t)[\exp[\alpha I_x(t)]+\exp[\alpha I_y(t)]]$$

Assuming a small modulation of light from the CW laser 60 by the light from the source under test 50, the optical spectrum measured by the OSA 540 around the optical frequency $\omega_0$ can be written up to a Dirac function at the optical frequency $\omega_0$ as:

$$I'''(\omega)=|\alpha|^2\cdot|\int I(t)\cdot\exp[i(\omega-\omega_0)t]dt|^2.$$

A representation of the RF spectrum of the source under test 50 can therefore be obtained by measuring the optical spectrum of the electric field of the polarized signal 535 using the OSA 540. Specifically, the RF spectrum of the source under test 50, which is defined by $S(\Omega)=|\int I(t)\cdot\exp(i\Omega t)dt|^2$, is given by the optical spectrum measured by the OSA 540 at the optical frequency $\omega=\omega_0+\Omega$.

In one embodiment of a method of the invention, light from an optical source under test (e.g. source under test 50) is coupled with light from a CW laser (e.g. CW laser 60) to generate a combined signal. The combined signal is then propagated through a polarization maintaining nonlinear apparatus (e.g. nonlinear apparatus 220) to modulate the electric field of the light from the CW laser using the temporal intensity of the light from the source under test to generate a modulated signal. The modulated signal is linearly polarized, and an optical spectrum of the polarized signal is measured to determine an RF spectrum of the optical source under test.

In a preferred embodiment, the method further comprises substantially compensating for any phase delay between polarization components of the combined signal due to propagation of the combined signal through the nonlinear medium (e.g. using a compensator 223).

In another preferred embodiment, the method further comprises substantially avoiding phase delay between polarization components of the combined signal. This can be achieved by adapting the nonlinear apparatus to mitigate the production of a phase difference between polarization components of signals propagated through the nonlinear apparatus 120, e.g. as discussed above with reference to the apparatus of FIG. 5.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

I claim:

1. An apparatus for polarization-independent RF spectrum analysis of an optical source under test, comprising:
    a coupler for coupling the light from the optical source under test with light from a continuous-wave (CW) laser to generate a combined signal, wherein the light from the optical source under test has an unspecified polarization state;
    a nonlinear apparatus coupled to the coupler for modulating the electric field of the light from the CW laser using the temporal intensity of the light from the optical source under test to generate a modulated signal substantially at the center frequency of the CW laser,
    wherein optical signals passing through the nonlinear apparatus undergo a nonlinear interaction selected from a group consisting of cross-phase modulation and cross-gain modulation, and
    wherein the nonlinear apparatus is adapted to mitigate or compensate for any phase difference between polarization components of the optical signals propagated through the nonlinear apparatus;
    a polarizer coupled to the nonlinear apparatus for generating a linearly polarized signal from the modulated signal; and
    an optical spectrum analyzer coupled to the polarizer for measuring the optical spectrum of the linearly polarized signal to determine the RF spectrum of the optical source under test,
    wherein the measured optical spectrum is defined by:

$I'''(\omega) = |\alpha|^2 \cdot |\int I(t) \cdot \exp[i(\omega-\omega_0)t] dt|^2$, after omission of a Dirac function at the optical frequency $\omega_0$; and the RF spectrum of the source under test, which is defined by:

$S(\Omega) = |\int I(t) \cdot \exp(i\Omega t) dt|^2$, and is given by the optical spectrum measured at the optical frequency $\omega = \omega_0 + \Omega$.

2. The apparatus of claim 1, wherein the nonlinear apparatus includes:
    a polarization maintaining nonlinear medium; and
    a compensator device coupled to the nonlinear medium which compensates any phase difference between polarization components of the signals propagated through the nonlinear apparatus.

3. The apparatus of claim 1, wherein the nonlinear apparatus includes:
    a first polarization maintaining nonlinear medium; and
    a second polarization maintaining nonlinear medium coupled to the first polarization maintaining nonlinear medium, having axes which are rotated by about 90° relative to the first polarization maintaining nonlinear medium, such that the combined signal traverses the first and second polarization maintaining nonlinear media along the same optical path.

4. The apparatus of claim 1, wherein the nonlinear apparatus includes:
    a circulator coupled to the coupler;
    a polarization maintaining nonlinear medium coupled to the circulator;
    and a reflector coupled to the polarization maintaining nonlinear medium;
    wherein the circulator, the nonlinear medium, and the reflector are operatively coupled such that combined signals from the coupler are routed by the circulator through the nonlinear medium, reflected off of the reflector back through the nonlinear medium, and routed by the circulator to the polarizer.

5. The apparatus of claim 1, wherein the nonlinear apparatus includes:
    a circulator coupled to the coupler;
    a polarizing beam splitter coupled to the circulator; and
    a nonlinear medium coupled to the polarizing beam splitter;
    wherein the circulator, the polarizing beam splitter, and the nonlinear medium are operatively coupled such that combined signals from the coupler are routed by the circulator through the polarizing beam splitter, whereby polarization components of the combined signal are counter-propagated along the same polarization mode through the nonlinear medium, recombined by the polarizing beam splitter, propagated back through the circulator, and routed through the polarizer.

6. A method for polarization-independent RF spectrum analysis of an optical source under test comprising:
    coupling the light from the optical source under test with light from a continuous-wave (CW) laser to generate a combined signal, wherein the from the optical source under test has an unspecified polarization state;
    propagating the combined signal through a nonlinear apparatus to generate a modulated signal substantially at the center frequency of the OW laser;and
    substantially compensating for any phase delay due to propagation of the combined signal through the nonlinear medium; and
    linearly polarizing the modulated signal; and
    measuring the optical spectrum of the linearly polarized modulated signal to determine the RF spectrum of the optical source under test;
    wherein the nonlinear apparatus comprises a nonlinear medium for modulating the electric field of the light from the OW laser using the temporal intensity of the light from the source under test; and
    wherein the measured optical spectrum is defined by:

$I'''(\omega) = |\alpha|^2 \cdot |\int I(t) \cdot \exp[i(\omega-\omega_0)t] dt|^2$, after omission of a Dirac function at the optical frequency $\omega_0$; and the RF spectrum of the source under test, which is defined by:

$S(\Omega) = |\int I(t) \cdot \exp(i\Omega t) dt|^2$, and is given by the optical spectrum measured at the optical frequency $\omega = \omega_0 + \Omega$.

7. The method of claim 6, wherein the step of modulating is affected by a nonlinear interaction selected from a group consisting of cross-phase modulation and cross-gain modulation.

8. A method for polarization-independent RF spectrum analysis of an optical source under test comprising:

coupling the light from the optical source under test with light from a continuous-wave (CW) laser to generate a combined signal, wherein the from the optical source under test has an unspecified polarization state;

propagating the combined signal through a nonlinear apparatus to generate a modulated signal substantially at the center frequency of the CW laser;

linearly polarizing the modulated signal; and measuring the optical spectrum of the linearly polarized modulated signal to determine the RF spectrum of the optical source under test;

wherein the nonlinear apparatus comprises a nonlinear medium for modulating the electric field of the light from the CW laser using the temporal intensity of the light from the source under test; and wherein the nonlinear apparatus is adapted to substantially avoid phase delay between polarization components of the combined signal; and wherein the measured optical spectrum is defined by:

$$I'''(\omega) = |\alpha|^2 \cdot |\int I(t) \cdot \exp[i(\omega-\omega_0)t] dt|^2,$$

after omission of a Dirac function at the optical frequency $\omega_0$; and the RF spectrum of the source under test, which is defined by:

$$S(\Omega) = |\int I(t) \cdot \exp(i\Omega t) dt|^2,$$

and is given by the optical spectrum measured at the optical frequency $$\omega = \omega_0 + \Omega.$$

* * * * *